(12) United States Patent
Fujii

(10) Patent No.: US 11,774,667 B2
(45) Date of Patent: Oct. 3, 2023

(54) BACKLIGHT

(71) Applicant: ENPLAS CORPORATION, Saitama (JP)

(72) Inventor: Yuki Fujii, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 18/106,774

(22) Filed: Feb. 7, 2023

(65) Prior Publication Data

US 2023/0266518 A1 Aug. 24, 2023

(30) Foreign Application Priority Data

Feb. 22, 2022 (CN) .......................... 202220358501.7

(51) Int. Cl.
*F21V 8/00* (2006.01)

(52) U.S. Cl.
CPC ............ *G02B 6/0073* (2013.01); *G02B 6/003* (2013.01); *G02B 6/0025* (2013.01); *G02B 6/0031* (2013.01)

(58) Field of Classification Search
CPC .... G02B 6/0073; G02B 6/0025; G02B 6/003; G02B 6/0031
See application file for complete search history.

(56) References Cited

U.S. PATENT DOCUMENTS 10,746,916 B2 * 8/2020 Fan ...................... G02B 6/0013

\* cited by examiner

*Primary Examiner* — Mary Ellen Bowman
(74) *Attorney, Agent, or Firm* — BROOKS KUSHMAN P.C.

(57) ABSTRACT

A backlight comprises a plurality of light sources mounted on a mounting substrate in rows; lenses respectively arranged on the light sources; and a reflective sheet disposed on the mounting substrate and provided with through-holes through which the light sources protrude, wherein a first light source spacing of the plurality of light sources in a row direction is set to Px, an inter-row spacing of the plurality of light sources in other direction orthogonal to the row direction is set to Py, a first maximum length of each of the through-holes in the reflective sheet in the row direction is set to a, an inter-row maximum length of each of the through-holes in the reflective sheet in the other direction is set to b, the reflectivity of the reflective sheet is set to a and the reflectivity of the mounting substrate is set to β, the following mathematical formula 1 is satisfied if $$Py > Px: \frac{\alpha(Px-a)+\beta a}{\alpha(Py-b)+\beta b} \cdot \frac{Py}{Px} > 0.9.$$

7 Claims, 6 Drawing Sheets

BACKLIGHT

CROSS-REFERENCE TO RELATED APPLICATION

This application claims priority to Chinese Patent Application No. 202220358501.7 filed on Feb. 22, 2022, which is incorporated herein by reference in its entirety.

TECHNICAL FIELD

The present disclosure relates to a backlight.

BACKGROUND

In the past, LEDs in backlight were arranged with narrow spacing in transverse and longitudinal directions, so as to achieve high-quality imaging. In recent years, in order to save the cost of the substrate, the transverse and longitudinal spacing of the LEDs have been changed by forming the substrate and the LEDs as bar shape in the transverse direction. That is to say, for example, because of been formed as bar shape with narrow transverse spacing, spacing of the bar-shaped LED rows in the longitudinal direction is larger than that in the transverse direction.

SUMMARY

Technical Problem

However, as the thickness of the device using the backlight (e.g. television and the like) becomes thinner and thinner, dark strip lines caused by the bar-shaped LED rows will be generated in the displayed image when lighting a single LED because of the difference in reflectivity between mounting substrate and reflective sheet (no reflective sheet laid on the portion provided with the LEDs).

Solution to Technical Problem

In order to solve the above problem, a first embodiment of the present disclosure provides a backlight characterized by comprising: a plurality of light sources mounted in rows on a mounting substrate; lenses arranged on each of the light sources, respectively; and a reflective sheet disposed on the mounting substrate and provided with through-holes through which the light sources protrude. A first light source spacing of the plurality of light sources in a row direction is set to Px, an inter-row spacing of the plurality of light sources in other direction orthogonal to the row direction is set to Py, a first maximum length of each of the through-holes in the reflective sheet in the row direction is set to a, an inter-row maximum length of each of the through-holes in the reflective sheet in the other direction is set to b, the reflectivity of the reflective sheet is set to α and the reflectivity of the mounting substrate is set to β, the following mathematical formula 1 is satisfied if Py>Px:

$$\frac{\alpha(Px-a)+\beta a}{\alpha(Py-b)+\beta b} \cdot \frac{Py}{Px} > 0.9 \quad \text{(formula 1)}$$

A backlight of a second embodiment of the present disclosure is characterized in that said formula 1 is satisfied if Py/Px≥1.5.

A backlight of a third embodiment of the present disclosure is characterized in that said formula 1 is satisfied if Py/Px≥2.

A backlight of a fourth embodiment of the present disclosure is characterized in that the backlight is further provided with a diffusion plate covering the plurality of light sources, and the following formula 2 is satisfied if a distance between the mounting substrate and the diffusion plate is set to h:

$$b/h \geq 0.7 \quad \text{(formula 2)}$$

A backlight of a fifth embodiment of the present disclosure is characterized in that the light sources are LEDs.

A backlight of a sixth embodiment of the present disclosure is characterized in that the backlight is further provided with a diffusion plate covering the plurality of light sources, the light sources are blue LEDs, and a wavelength conversion sheet is provided on the diffusion plate.

A backlight of a seventh embodiment of the present disclosure is characterized in that each of the lens has an ellipse or oval shape which has a longer length in the other direction than in the row direction when view from the top, or each of the lens has a circular shape when view from the top.

The present disclosure has the following advantageous effect.

In the case of the thickness of the device using the backlight (e.g. television and the like) becomes thinner, the present invention is able to suppress the generation of dark strip lines due to the difference in reflectivity between the mounting substrate and the reflective sheet even if a single LED is lit.

10: mounting substrate; 20: LED; 30: lens; 40: reflective sheet; 50: diffusion plate; 60: wavelength conversion sheet; 100: backlight; 401: through-hole; a: first maximum length; b: inter-row maximum length; Px: first light source spacing; Py: inter-row spacing; α: reflectivity of reflective sheet; β: reflectivity of mounting substrate.

DETAILED DESCRIPTION

Overall Structure of Backlight 100

Figure 1:
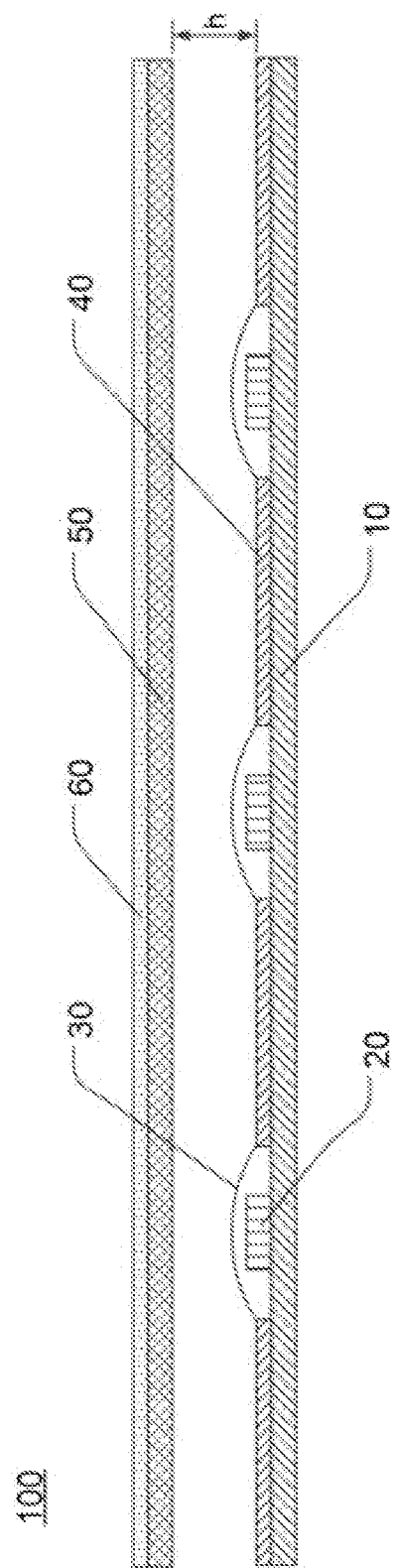
FIG. 1 is a schematic view showing a structure of a backlight 100.

The overall structure of a backlight 100 according to the present disclosure will be described with reference to FIG. 1. FIG. 1 is a schematic view showing the structure of the backlight 100. As shown in FIG. 1, the backlight 100 includes: a plurality of light sources, i.e., LEDs 20, which are mounted in rows on a mounting substrate 10; lenses 30 arranged on each of the LEDs 20, respectively; a reflective sheet 40 disposed on the mounting substrate 10 and provided with through-holes 401 through which the LEDs 20 protrude; a diffusion plate 50 covering the plurality of LEDs 20; and a wavelength conversion sheet 60 disposed on the diffusion plate 50. Although not illustrated, an optical brightness enhancement film (DBFF) or the like can be provided on the wavelength conversion sheet 60.

Here, the LEDs 20 used as the light sources are blue LEDs, the reflectivity of the reflective sheet 40 relative to the light sources is a and the reflectivity of the mounting substrate 10 relative to the light sources is ft.

Structure of Reflective Sheet 40

Figure 2:
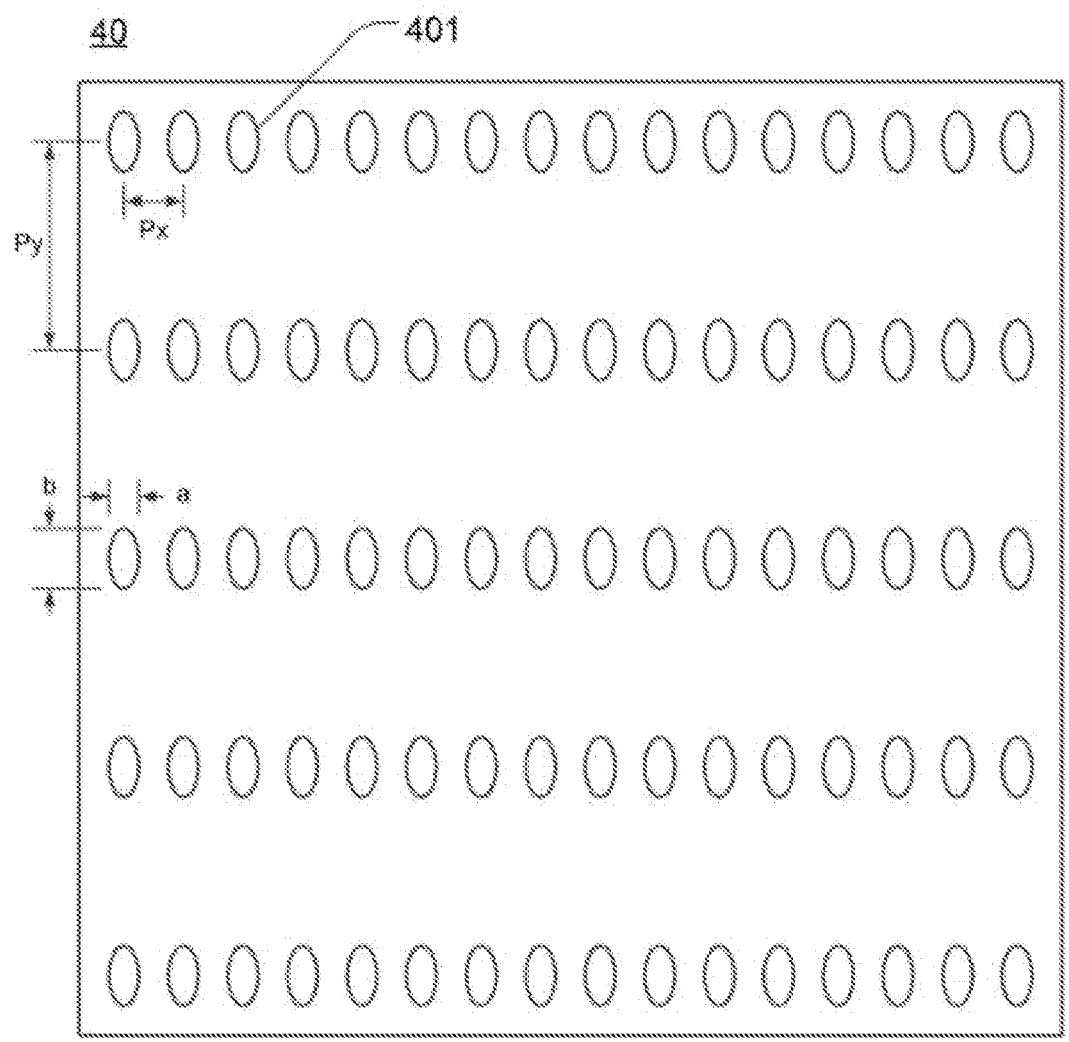
FIG. 2 is a top view of a reflective sheet 40.

The structure of the reflective sheet 40 according to the present disclosure will be described with reference to FIG. 2. FIG. 2 is a top view of the reflective sheet 40. As shown in FIG. 2, ellipse shaped through-holes 401 are formed in the reflective sheet 40. Here, the spacing between the through-holes 401 and the specific size of each of the through-holes itself are set as follows.

A first light source spacing between the through-holes 401 in a transverse direction is set to Px, an inter-row spacing between the through-holes 401 in a longitudinal direction is set to Py, a first maximum length of each of the through-holes 401 itself in the transverse direction is set to a, and an inter-row maximum length of each of the through-holes 401 itself in the longitudinal direction is set to b. Here, as shown in FIG. 2, the first light source spacing Px is less than the inter-row spacing Py, and the first maximum length a is less than the inter-row maximum length b.

Here, for the reflective sheet 40 with the through-holes 401 through which the LEDs 20 protrude, it is not limited to a case where outer edge of the through-hole 401 is totally located below the lens 30, but also includes a case where the outer edge of the though-hole 401 is located outside the lens 30.

Description of Reflectivity

When setting the reflectivity of the reflective sheet 40 to a and setting the reflectivity of the mounting substrate 10 to β, transverse reflectivity and longitudinal reflectivity of the backlight 100 satisfy the following formulas:

Transverse reflectivity=$[a(Px-a)+\beta a]/Px$ (formula 3)

Longitudinal reflectivity=$[a(Py-b)+\beta b]/Py$ (formula 4)

In the present disclosure, when Py>Px, it is necessary to make the transverse reflectivity and longitudinal reflectivity satisfy the following formula in order to suppress the generation of dark strip lines due to the difference in reflectivity between the mounting substrate 10 and the reflective sheet 40:

Transverse reflectivity/Longitudinal reflectivity>0.9 (formula 5)

The following formula 1 is obtained by sorting out the above formulas 3 to 5:

$$\frac{\alpha(Px-a)+\beta a}{\alpha(Py-b)+\beta b} \cdot \frac{Py}{Px} > 0.9 \quad \text{(formula 1)}$$

Although the above description is based on Py>Px, it is not limited thereto. In particular, if said formula 1 is satisfied when Py/Px≥1.5, the effect of suppressing the generation of dark strip lines due to the difference in reflectivity between the mounting substrate 10 and the reflective sheet 40 can also be achieved. Further, if said formula 1 is satisfied when Py/Px≥2, the effect of suppressing the generation of dark strip lines due to the difference in reflectivity between the mounting substrate 10 and the reflective sheet 40 can also be achieved.

Overall Thickness of Backlight 100

As shown in FIG. 1, a distance between the mounting substrate 10 and the diffusion plate 50 is set to h. When the distance h gradually decreases, dark strip lines will also be generated due to the difference in reflectivity between the mounting substrate 10 and the reflective sheet 40. However, if the above-mentioned parameters (such as Px, Py, a, b, a and β) satisfy said formula 1, the effect of suppressing the generation of dark strip lines due to the difference in reflectivity between the mounting substrate 10 and the reflective sheet 40 can also be achieved even if the distance h satisfies the following formula 2:

$b/h≥0.7$ (formula 2)

Specific Examples

Figure 3:
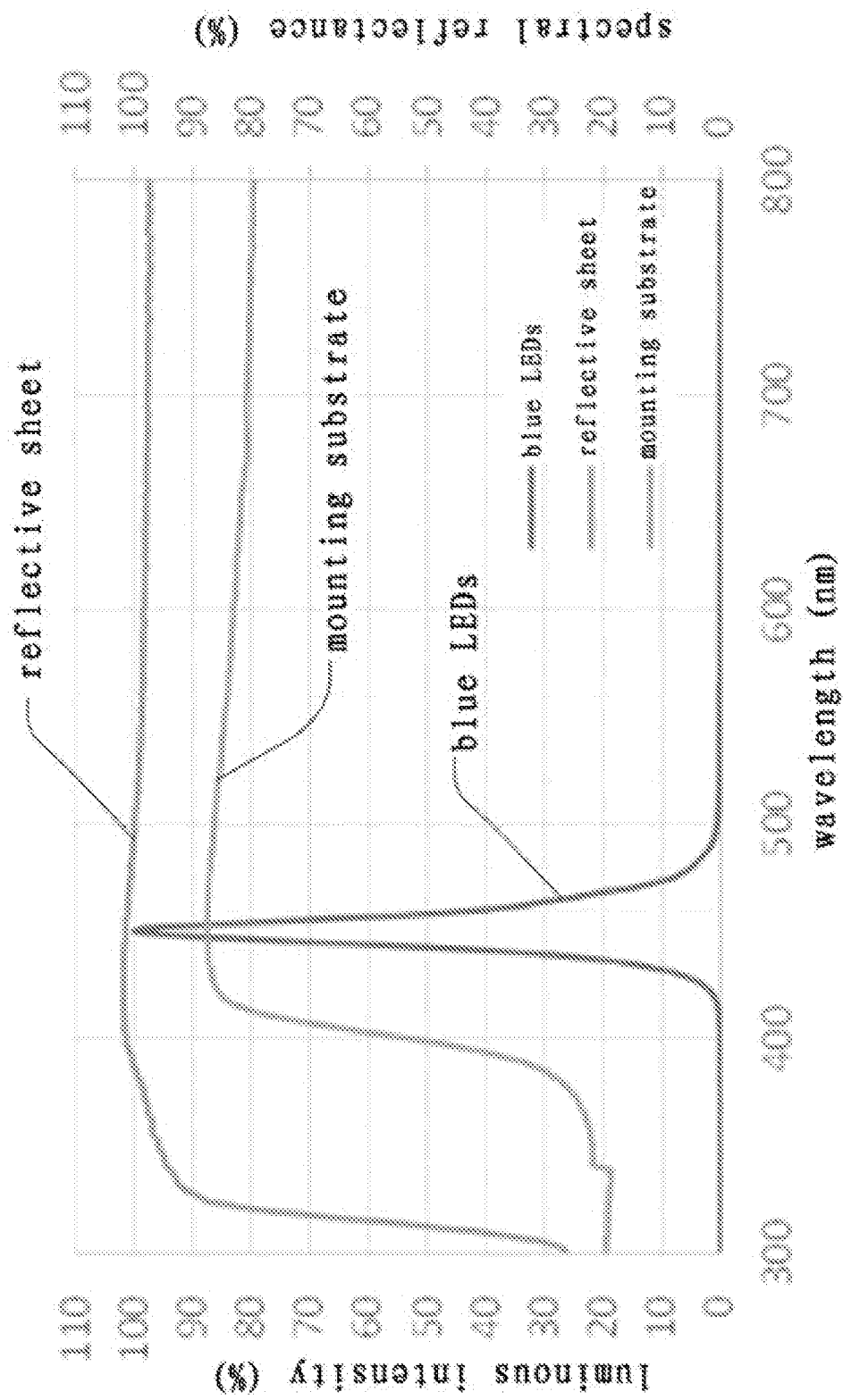
FIG. 3 is a diagram showing the luminous intensity of a blue LED 20 and spectral reflectance of a mounting substrate 10 and of the reflective sheet 40.
Figure 4:
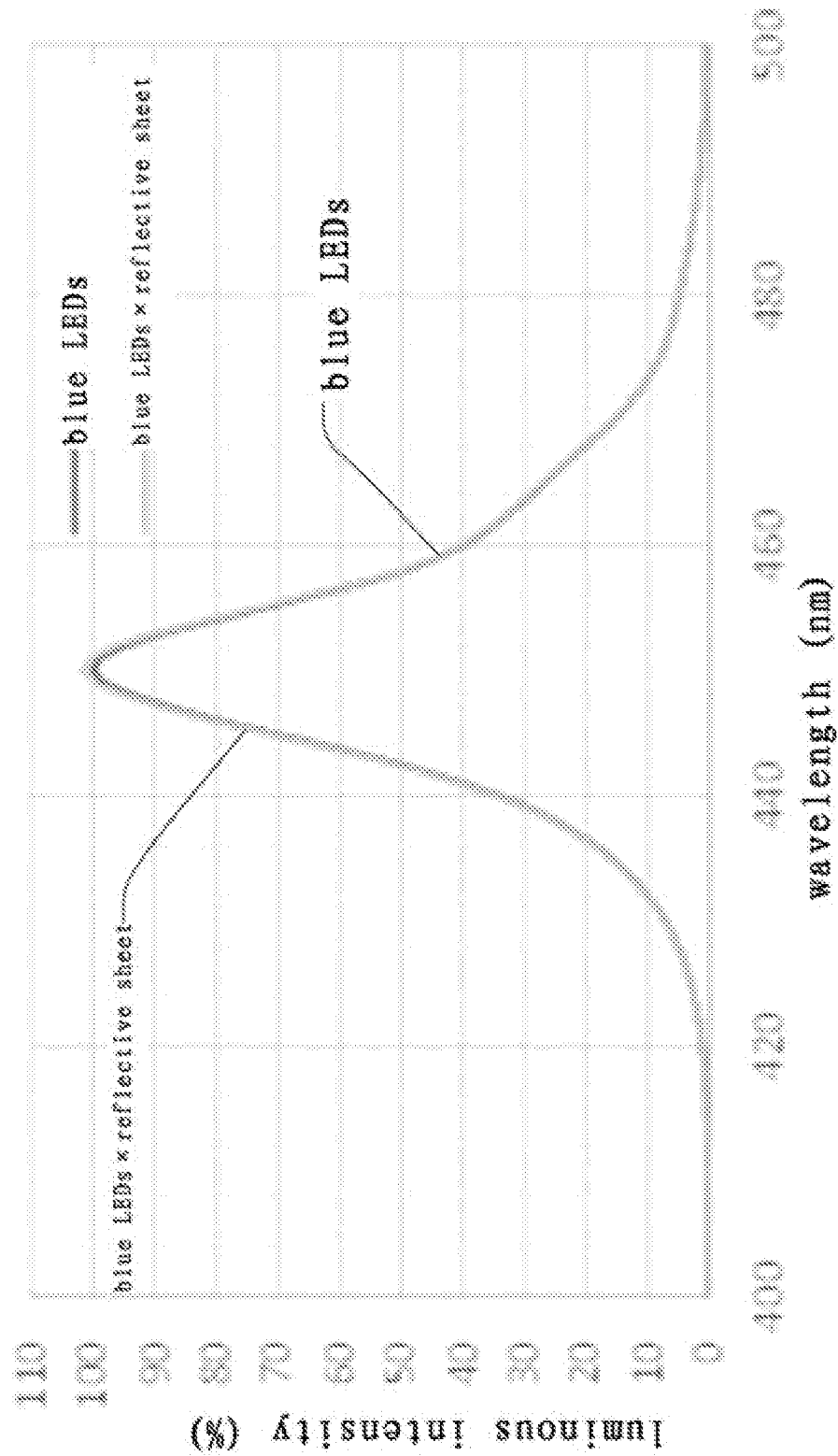
FIG. 4 is a diagram showing the luminous intensity of a blue LED 20 and the luminous intensity of the blue LED 20 after passing through the reflective sheet 40.
Figure 5:
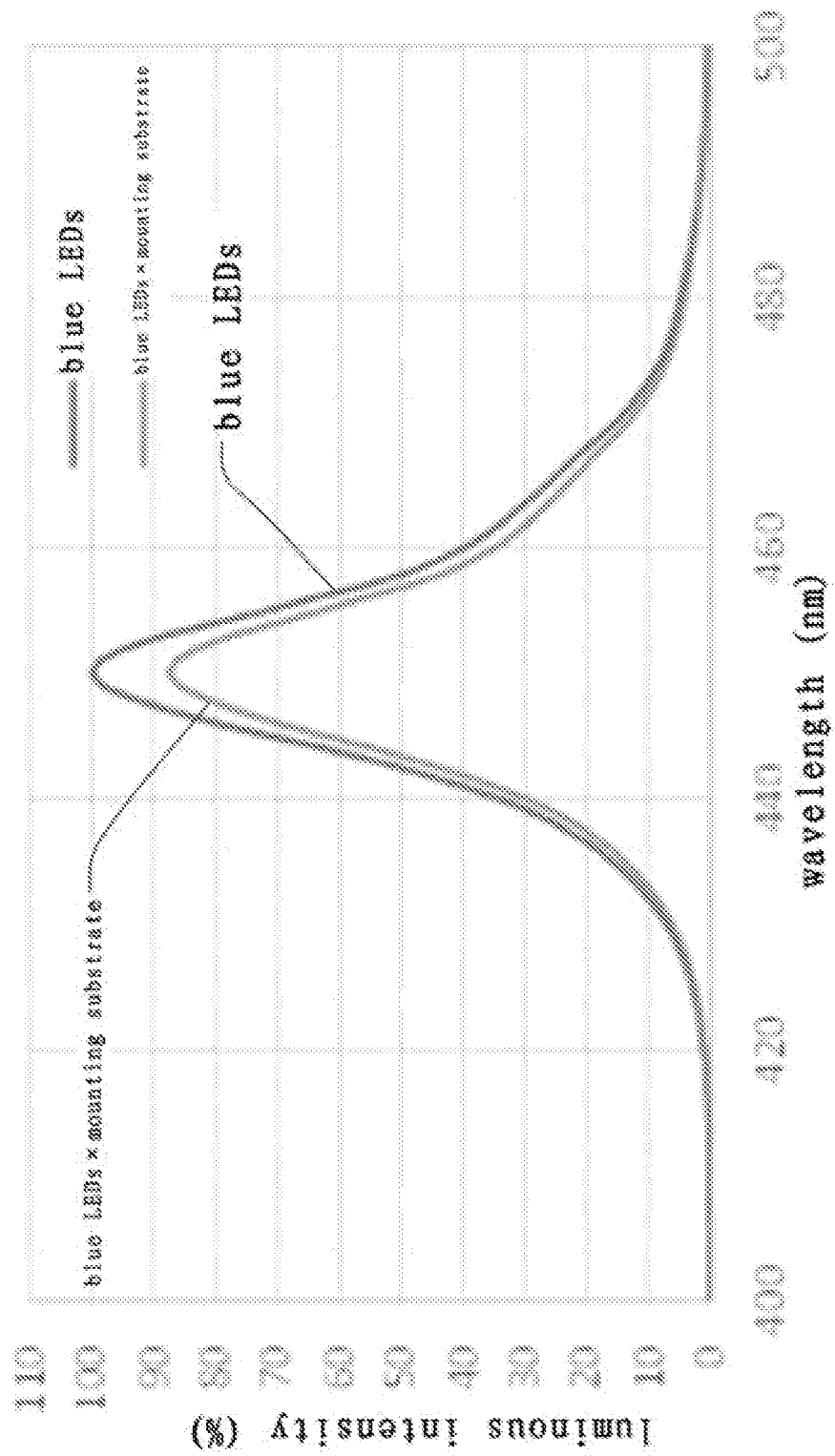
FIG. 5 is a diagram showing the luminous intensity of a blue LED 20 and the luminous intensity of the blue LED 20 after passing through the mounting substrate 10.

Specific examples of the above-mentioned embodiment will be described below with reference to FIGS. 3 to 6. FIG. 3 is a diagram showing the luminous intensity of a blue LED 20 and spectral reflectance of the mounting substrate 10 and of the reflective sheet 40. FIG. 4 is a diagram showing the luminous intensity of a blue LED 20 and the luminous intensity of the blue LED 20 after passing through the reflective sheet 40. FIG. 5 is a diagram showing the luminous intensity of a blue LED 20 and the luminous intensity of the blue LED 20 after passing through the mounting substrate 10.

As shown in FIG. 3, the curve of luminous intensity of the blue LED 20 intersects with the curves of spectral reflectance of the reflective sheet 40 and the mounting substrate 10 in the range of wavelength of 400 to 500 nm. As shown in FIG. 4, the curve of luminous intensity of the blue LED 20 substantially overlaps the curve of luminous intensity of the LED 20 after passing through the reflective sheet 40. Through calculation, it can be seen that the reflectivity of the reflective sheet 40 to the blue LED 20 is 101.3%, that is, a is 101.3%. As shown in FIG. 5, the curve of luminous intensity of the blue LED 20 does not overlap the curve of luminous intensity of the blue LED 20 after passing through the mounting substrate 10. Through calculation, it can be seen that the reflectivity of the mounting substrate 10 to the blue LED 20 is 87.3%, that is, β is 87.3%.

Figure 6D:
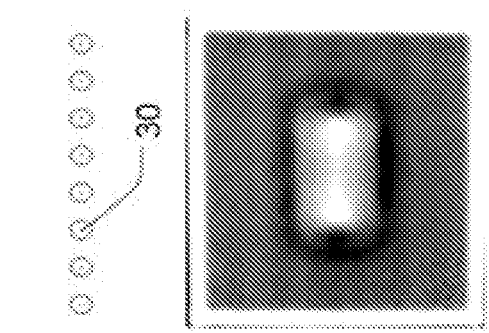
FIG. 6D shows a structural view and an effect picture in a case where the result of formula 1 is greater than 0.9 (1.00).
Figure 6C:
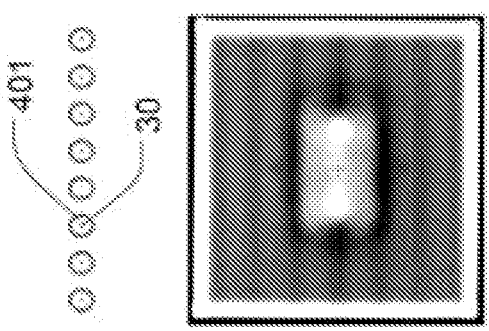
FIG. 6C shows a structural view and an effect picture in a case where the result of formula 1 is greater than 0.9 (0.94).
Figure 6B:
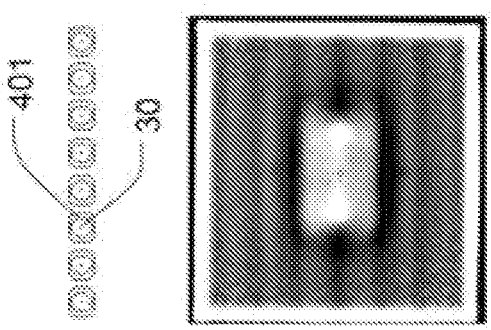
FIG. 6B shows a structural view and an effect picture in a case where the result of formula 1 is greater than 0.9 (0.92).
Figure 6A:
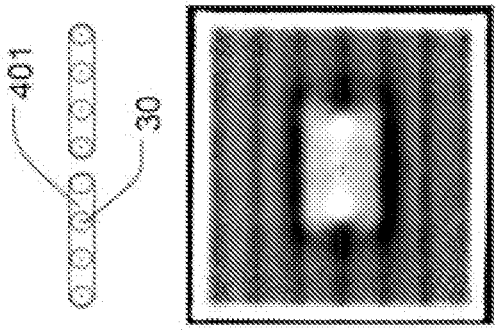
FIG. 6A shows a structural view and an effect picture in a case where the result of formula 1 is less than 0.9 (0.89).

With reference to FIGS. 6A to 6D, said formula 1 of the present disclosure is verified as follows. FIG. 6A shows a structural view and an effect picture in a case where the result of formula 1 is less than 0.9 (0.89). FIG. 6B shows a structural view and an effect picture in a case where the result of formula 1 is greater than 0.9 (0.92). FIG. 6C shows a structural view and an effect picture in a case where the result of formula 1 is greater than 0.9 (0.94). FIG. 6D shows a structural view and an effect picture in a case where the result of formula 1 is greater than 0.9 (1.00).

As shown in the upper view of FIG. 6A, the lenses 30 are arranged in sets of four and through-holes 401 are provided in the reflective sheet 40, other parameters are set as follows: a=18 mm; b=12 mm; Px=18 mm; Py=57.8 mm; α=101.3%; β=87.3%. As a result, left part of formula 1 equals to 0.89, which is less than 0.9. At this time, as shown in the lower view of FIG. 6A, there are obvious dark strip lines due to the difference in reflectivity between the mounting substrate 10 and the reflective sheet 40, and thus has a very bad display effect.

As shown in the upper view of FIG. 6B, the lenses 30 are individually arranged one by one and larger through-holes 401 are provided in the reflective sheet 40, other parameters are set as follows: a=14 mm; b=12 mm; Px=18 mm; Py=57.8 mm; α=101.3%; β=87.3%. As a result, left part of formula 1 equals to 0.92, which is greater than 0.9. At this time, as shown in the lower view of FIG. 6B, dark strip lines due to the difference in reflectivity between the mounting substrate 10 and the reflective sheet 40 are slightly blurred, and the display effect is slightly improved.

As shown in the upper view of FIG. 6C, the lenses 30 are individually arranged one by one and through-holes 401 that suitable for the lenses 30 are provided in the reflective sheet 40, other parameters are set as follows: a=11 mm; b=12 mm; Px=18 mm; Py=57.8 mm; α=101.3%; β=87.3%. As a result, left part of formula 1 equals to 0.94, which is greater than 0.9. At this time, as shown in the lower view of FIG. 6C, dark strip lines due to the difference in reflectivity between the mounting substrate 10 and the reflective sheet 40 almost disappear, thus the display effect is significantly improved as compared with FIG. 6B.

As shown in the upper view of FIG. 6D, the reflective sheet 40 is placed under the lenses 30, and other parameters are set as follows: a=0 mm; b=0 mm; Px=18 mm; Py=57.8 mm; α=101.3%; β=87.3%. As a result, left part of formula 1 equals to 1.00, which is greater than 0.9. At this time, as shown in the lower view of FIG. 6D, no dark strip lines are generated due to the difference in reflectivity between the mounting substrate 10 and the reflective sheet 40, and the display effect is further improved as compared with FIG. 6C.

Other Modifications

In the above specific examples, each lens 30 has an ellipse shape when view from the top, but it is not limited thereto, and it may be an oval shape or circular shape.

The present disclosure has been described with one LED light source used as a single light source, but the present disclosure is not limited thereto, a plurality of (e.g. four) LED light sources may be connected to one single lens by a plurality of (e.g. four) optical control units each having an emitting surface and by one single flange. In this case, the reflective sheet may be laid below the lens and provided with through-holes respectively corresponding to the plurality of LED light sources so as to obtain the backlight according to the present disclosure.

In the present disclosure, the case in which an optical brightness enhancement film (DBFF) is provided on the wavelength conversion sheet has been described. However, the present disclosure is not limited thereto, and a DPOP (with DBFF and Prism attached) may be provided on the wavelength conversion sheet and a DOP (with Diffuser and Prism attached) may be further provided between the wavelength conversion sheet and the diffusion plate accordingly.

What is claimed is:

1. A backlight, comprising:
a plurality of light sources mounted in rows on a mounting substrate;
lenses arranged on each of the light sources, respectively; and
a reflective sheet disposed on the mounting substrate and provided with through-holes through which the light sources protrude,
wherein a first light source spacing of the plurality of light sources in a row direction is set to Px, an inter-row spacing of the plurality of light sources in other direction orthogonal to the row direction is set to Py, a first maximum length of each of the through-holes in the reflective sheet in the row direction is set to a, an inter-row maximum length of each of the through-holes in the reflective sheet in the other direction is set to b, the reflectivity of the reflective sheet is set to α and the reflectivity of the mounting substrate is set to β, the following mathematical formula 1 is satisfied if Py>Px:

$$\frac{\alpha(Px-a)+\beta a}{\alpha(Py-b)+\beta b} \cdot \frac{Py}{Px} > 0.9.$$ (formula 1)

2. The backlight according to claim 1, wherein, the formula 1 is satisfied if Py/Px≥1.5.
3. The backlight according to claim 1, wherein, the formula 1 is satisfied if Py/Px≥2.
4. The backlight according to claim 1, wherein, the backlight is further provided with a diffusion plate covering the plurality of light sources, and the following formula 2 is satisfied if a distance between the mounting substrate and the diffusion plate is set to h:

$$b/h \geq 0.7$$ (formula 2).

5. The backlight according to claim 1, wherein, the light sources are LEDs.
6. The backlight according to claim 1, wherein, the backlight is further provided with a diffusion plate covering the plurality of light sources, the light sources are blue LEDs, and a wavelength conversion sheet is provided on the diffusion plate.
7. The backlight according to claim 1, wherein, each of the lens has an ellipse or oval shape which has a longer length in the other direction than in the row direction when view from the top, or each of the lens has a circular shape when view from the top.

* * * * *